(12) United States Patent
MacCone et al.

(10) Patent No.: US 6,790,890 B2
(45) Date of Patent: Sep. 14, 2004

(54) AQUEOUS COMPOSITIONS OF PERFLUOROPOLYETHER PHOSPHATES AND USE THEREOF TO CONFER OLEO-REPELLENCE TO PAPER

(75) Inventors: Patrizia MacCone, Milan (IT); Fiorenza D'Aprile, Milan (IT); Mario Visca, Alessandria (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 10/340,729

(22) Filed: Jan. 13, 2003

(65) Prior Publication Data

US 2003/0134952 A1 Jul. 17, 2003

(30) Foreign Application Priority Data

Jan. 15, 2002 (IT) ..................................... MI2002A0056

(51) Int. Cl.[7] .................................................. C08L 1/00
(52) U.S. Cl. ..................... 524/300; 524/315; 524/366; 524/379; 568/560; 568/561; 568/606; 568/614
(58) Field of Search ................................ 524/300, 315, 524/366, 379, 415, 416, 805; 568/560, 561, 606, 614

(56) References Cited

U.S. PATENT DOCUMENTS

| | | |
|---|---|---|
| 3,242,218 A | 3/1966 | Miller et al. |
| 3,492,374 A | 1/1970 | Le Bleu et al. |
| 3,715,378 A | 2/1973 | Sianesi et al. |
| 3,810,874 A | 5/1974 | Mitsch et al. |
| 4,523,039 A | 6/1985 | Lagow et al. |
| 4,647,413 A | 3/1987 | Savu |
| 5,149,842 A | 9/1992 | Sianesi et al. |
| 5,258,110 A | 11/1993 | Sianesi et al. |
| 5,271,806 A | 12/1993 | Deutsch et al. |
| 5,874,169 A | 2/1999 | Falcone |
| 6,197,903 B1 | 3/2001 | Maccone et al. |
| 6,221,434 B1 * | 4/2001 | Visca et al. .............. 427/393.4 |

FOREIGN PATENT DOCUMENTS

| | | |
|---|---|---|
| DE | 24 05 042 A | 8/1975 |
| EP | 0 148 482 A2 | 7/1985 |
| EP | 0 239 123 A2 | 9/1987 |
| EP | 0 340 740 A2 | 11/1989 |
| EP | 0 687 533 A1 | 12/1995 |
| EP | 1 006 168 A | 6/2000 |
| EP | 1 074 243 A | 2/2001 |
| EP | 1 225 178 A1 | 7/2002 |
| GB | 1104482 | 2/1968 |
| WO | WO 90/03357 | 4/1990 |
| WO | WO 01/30873 A1 | 5/2001 |

* cited by examiner

*Primary Examiner*—William Cheung
(74) *Attorney, Agent, or Firm*—Arent Fox PLLC

(57) ABSTRACT

Aqueous compositions of (per)fluoropolyether phosphates of formula:

$$T-O-[R_f-CFY-L-O]P(O)(O^-Z^+)(OH); \text{ and/or} \quad (A)$$

$$(OH)_m(O^-Z^+)_{2-m}P(O)[O-L-YFC-O-R_f-CFY-L-O-P(O)(O^-Z^+)]_{m'}-[O-L-YFC-O-R_f-CFY-L-O]P(O)(O^-Z^+)_{2-m}(OH)_m \quad (B)$$

and use thereof to confer oleo-repellence to the paper in bulk by means of the wet-end method.

16 Claims, No Drawings

AQUEOUS COMPOSITIONS OF PERFLUOROPOLYETHER PHOSPHATES AND USE THEREOF TO CONFER OLEO-REPELLENCE TO PAPER

The present invention relates to aqueous compositions for the wet-end treatment of cellulose fibres/fibrilles for the manufacture of paper having oleo-repellence properties.

More specifically the invention relates to aqueous compositions based on fluorinated products capable to confer to paper an oleo-repellence capable to pass the application tests required by the manufacturers of oleo-repellent articles (grease-proof test) for the food or pet-food industry.

It is well known that the paper is used for the packaging of fats based on vegetable oils, of products as coffee, chocolate and also for the packaging of foods having a high fat content as meats, chips, hamburgers, popcorns, foods to be cooked in microwave ovens, and pet food. For said uses it is necessary that the paper be treated with products capable to confer resistance to oils and greases.

The oleo-repellence is commonly evaluated in terms of resistance of the paper sized to the penetration of the oil contained in hydrocarbon drops or hydrocarbon mixtures having a progressively decreasing surface tension, maintained for 15 seconds in contact with the paper specimen (Kit Test, TAPPI 557 method). Usually drops consisting of mixtures of castor oil, toluene and heptane in various ratios are used. The oleo-repellence values obtained with the Kit Test are however an index of the only surface activity of the fluorinated additive and often they have a poor correlation with the real performance in terms of protective barrier to oils and fats, both in normal utilization conditions of the paper packages in which there are prolonged contact times with foods, and in severe utilization conditions due to the temperature (heating of the food packages in microwave ovens) and mechanical stresses due to the bending to obtain the mnanufactured article. On this ground users utilize a series of tests considered more adherent to practical applications such for example:

Ralston Crease Test (RP-2 test): The resistance properties to the oil penetration in greaseproof papers for pet-food packaging are evaluated. The percentage of the surface of the paper stained by the coloured oil is determined. The specimen acceptability limit threshold is 2% of stained surface.

Resistance test to oleic acid: The resistance to oleic acid is evaluated at 60° C. for two hours. The test is passed when the paper is not stained and it does not show halos (% of stained surface=0).

Resistance test to fat acid mixtures: The resistance to a mixture of palmitic/lauric fat acids ($C_{16}/C_{12}$) is evaluated at 65° C. for 5 minutes. The test is passed when the paper is not stained and it does not show halos.

See the examples for the detailed description of said tests.

Compositions to confer oleo-repellent properties to the already formed paper are known in the prior art. However it is well known that the compositions used for said treatments are not necessarily effective when used for wet-end applications. In fact when said compositions are added to the paper slurry, to confer oleo-repellence they must be uniformly adsorbed on the paper fibrilles, which not always happens since said compositions can interact with the various additives present in the paper slurry, such for example polymer retention agents.

Known oleo-repellent compositions contain fluorinated components among which phosphates containing perfluoroalkyl groups, polymers containing pendent perfluoroalkanes with respect to the backbone and/or derivatives thereof in the presence of surfactants having a perfluoroalkyl chain (for example U.S. Pat. No. 5,271,806) can be mentioned. Said commercially used components contain perfluoroalkyl segments which by degradation give rise to perfluorooctyl components to be avoided since they tend to bioaccumulate. See for example patent WO 01/30873.

In U.S. Pat. No. 6,221,434 the use of (per)fluoropolyether phosphoric mono- or diesters for the paper surface sizing to confer oleo-repellence is described. According to the examples said components are used, also in salified form with $NH_4OH$, in an aqueous solution containing isopropyl alcohol in a weight ratio 4:1 and 10:1 with respect to the component, in which the paper is dipped. In this patent no mention is made to the use of said components for their wet-end application of the paper. Tests carried out by the Applicant in the paper wet-end application using said compounds in aqueous solution containing isopropanol in a weight ratio with said compounds 4:1 have shown that said components are unable to confer satisfactory oleo-repellence values to pass the application tests required in the food industry (see the comparative Examples).

The need was therefore felt to have available aqueous compositions which in the wet-end applications conferred to paper an oleo-repellence capable to pass the most severe performance tests, such as those of resistance to oleic acid and to fat acid mixtures.

The Applicant has unexpectedly and surprisingly found specific aqueous compositions based on (per) fluoropolyether phosphates capable to satisfy the above mentioned requirements.

An object of the present invention are aqueous compositions comprising the following components:

I) a phosphate selected from the following

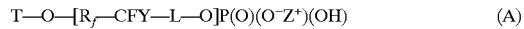

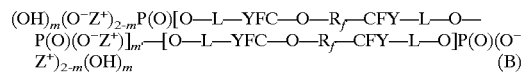

or mixtures of A) and B)

wherein m' is an integer from 0 to 20, preferably from 0 to 4;

L is an organic group selected from —$CH_2$—(O$CH_2$$CH_2$)$_n$—, —CO—NR'—($CH_2$)$_q$—, with R'=H or $C_1$–$C_4$ alkyl; n is a number from 0 to 8, preferably from 1 to 3; q is a number from 1 to 8, preferably from 1 to 3;

$Z^+$=alkaline metal ion or a $NR_4$ group with R=H or $C_1$–$C_4$ alkyl or an aliphatic amine ion;

Y=F, $CF_3$;

m is a number between 0 and 1, extremes included;

$R_f$ is a (per)fluoropolyoxyalkylene chain having a number average molecular weight between 350 and 8,000, preferably between 500 and 3,000, formed by repeating units, statistically distributed along the chain, having at least one of the following structures:

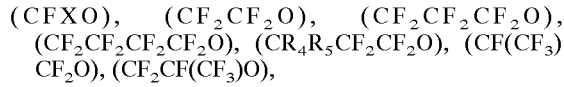

wherein

X=F, $CF_3$;

$R_4$ and $R_5$, equal to or different from each other, are selected from H, Cl, or perfluoroalkyl from 1 to 4 carbon atoms;

T is a (per)fluoroalkyl group selected from —$CF_3$, —$C_2F_5$, —$C_3F_7$, —$CF_2Cl$, —$C_2F_4Cl$, —$C_3F_6Cl$, optionally substituted with one or two H atoms, preferably one, at the place of F atoms; and II) a solvent selected from $C_1$–$C_5$ aliphatic alcohols, preferably isobutanol, aliphatic and cyclic ethers, preferably tetrahydrofuran, aliphatic acetates and mixtures thereof wherein the ratio by weight between components I and II is in the range 1:1–1:0.05, preferably 1:0.5–1:0.1.

When component I) having formula (B) is used, mixtures of components B) wherein m' is different from 0, preferably 1, can be used with components B) wherein m'=0, in a molar ratio in the range 5:95–50:50.

In particular $R_f$ in the (A) and (B) structures can have one of the following structures:

1) —$(CF_2O)_{a'}$—$(CF_2CF_2O)_{b'}$—
   with a'/b' comprised between 0.5 and 2, extremes included, a' and b' being integers such to give the above mentioned molecular weight;

2) —$(C_3F_6O)_r$—$(C_2F_4O)_b$—$(CFXO)_t$—
   with r/b=0.5–2.0; (r+b)/t is in the range 10–30,
   b, r and t being integers such to give the above mentioned molecular weight, X has the above indicated meaning;

3) —$(C_3F_6O)_{r'}$—$(CFXO)_{t'}$—
   t' can be 0;
   when t' is different from 0 then r'/t'=10–30,
   r' and t' being integers such to give the above mentioned molecular weight; X has the above indicated meaning;

4) —$(OCF_2CF(CF_3))_z$—$OCF_2(R'f)_y$—$CF_2O$—$(CF(CF_3)CF_2O)_z$—
   wherein z is an integer such that the molecular weight be that above mentioned;
   y is an integer comprised between 0 and 1 and R'f is a fluoroalkylene group for example from 1 to 4 carbon atoms;

5) —$(OCF_2CF_2CR_4R_5)_q$—$OCF_2(R'f)_y$—$CF_2O$—$(CR_4R_5CF_2CF_2O)_s$—
   wherein:
   q and s are integers such that the molecular weight be that above mentioned;
   $R_4$, $R_5$, R'f, y have the above indicated meaning;

6) —$(C_3F_6O)_{r''}$—$(CFXO)_{t''}$—$OCF_2(R'f)_y$—$CF_2O(CF(CF_3)CF_2O)_{r''}$—$(CFXO)_{t''}$—
   wherein r''/t''=10–30,
   r'' and t'' being integers such to give the above mentioned molecular weight; R'f and y having the above indicated meaning.

The monofunctional and bifunctional (per)fluoropolyoxyalkylenes can be prepared starting from the corresponding (per)fluoropolyoxyalkylenes having —COF end groups (see for example patents GB 1,104,482, U.S. Pat. Nos. 3,715,378, 3,242,218, 4,647,413, EP 148,482, U.S. Pat. No. 4,523,039, EP 340,740, WO 90/03357, U.S. Pat. No. 3,810,874, EP 239,123, U.S. Pat. Nos. 5,149,842, 5,258,110).

The invention compositions are prepared by adding to the phosphates corresponding to component I) wherein $Z^+=H^+$, an amount of solvent II) in the ratios above mentioned for components I) and II), an aqueous solution of a base until reaching a pH in the range 7–10. Preferably the base is selected between ammonia and triethanolamine.

The invention compositions are prepared as concentrates containing 20–25% by weight of phosphates I), component II) is in the above mentioned ratio, the complement to 100% by weight is water. Said compositions can be subsequently diluted with water at the application time, preferably containing 0.1–5% by weight of phosphate I) with respect to the dry cellulose. Said compositions diluted for the wet-end application show an average size of the aggregates of the phosphate I) lower than 150 nm, determined by Dynamic Laser Light Scattering (DLLS).

The wet-end process consists in the paper formation starting from a cellulose slurry in water. The slurry can be formed or by virgin soft wood or hard wood, obtained by Kraft and/or sulphite process, suitably refined, or by recycled cellulose slurries or also by mixtures of said two kinds of slurries. The dry cellulose concentration in the slurry ranges from 0.1% to 10% by weight. The pulp-slurry can contain the additives normally used in the paper industry, for example organic or inorganic fillers, such as talc, kaolin, calcium carbonate or titanium dioxide; supporting agents as starches, dextrins, retention agents, flocculating agents, buffer systems, fungicides, biocides, sequestrants, gluing agents such as ASA (alkenyl succinic anhydride) or AKD (alkyl ketene dimer). The cellulose suspension can have both acid and basic pH, preferably basic.

The invention compositions are generally added to the aqueous cellulose slurry in an amount such to obtain paper having a phosphate I) content in the range 0.1%–5% by weight with respect to the cellulose dry content.

To improve the phosphate retention on the cellulose fibers, it is preferable to add to the pulp-slurry a fixative agent, before adding the phosphate. Said fixative agent is generally a cationic compound, often of polymer nature, having a molecular weight ranging from 10,000 to 5,000,000, in an amount ranging from 0.01% to 1% by weight of cationic compound based on the dry cellulose. The fixative agents are for example the following: cationic polyacrylamides, polyamines, polyamidoamine-epichlorohydrin or dimethylamine-epichlorohydrin copolymers, polyethylenimines, polydially-dimethyl-ammonium chloride. To the pulp-slurry chelants can be added to moderate the water hardness.

After addition of the phosphate to the cellulose slurry, the water is removed obtaining a wet paper which is dried, for example, at temperatures in the range 90° C.–130° C., according to the standard procedures used in the paper industry.

The preparation of the (per)fluoropolyether phosphates I) can be carried out as follows. The structure (A) monofunctional phosphates can be prepared by reacting the corresponding (per)fluoroalkylenoxides hydroxy-ended with $POCl_3$. To obtain compound A) it is necessary to use a molar ratio $POCl_3$/hydroxy-ended compound in the range 2/1–10/1, preferably 6/1–8/1. The reaction is carried out by slowly dropping the hydroxy-ended compound in POCl3, at a temperature between 50° and 100° C., preferably between 70° and 80° C., by removing the HCl vapours in a KOH trap. The $POCl_3$ excess is removed by distillation while the formed adduct is hydrolyzed by $H_2O$. The obtained product separation takes place by extraction with a suitable organic solvent, such for example ethyl acetate.

The structure (A) product is separated from the organic phase according to known techniques, for example by solvent evaporation.

The structure (B) bifunctional (per)fluoropolyether phosphates preparation can be carried out by reacting the corresponding (per)fluoroalkylenoxides di-hydroxy-ended with $POCl_3$. To obtain the derivative with m'=0, it is necessary to use a molar ratio $POCl_3$/di-hydroxy-ended compound comprised between 4/1 and 20/1, preferably between 12/1 and 16/1. The reaction is carried out by slowly dropping the hydroxy-ended compound in $POCl_3$, at a temperature in the range 50°–100° C., preferably 70°–80° C., by eliminating the HCl vapours in a KOH trap. The $POCl_3$ excess is removed by distillation while the formed adduct is hydrolyzed by $H_2O$. The separation of the product (B) with m'=0 takes place by extraction with a suitable organic solvent, such for example ethyl acetate. From the organic phase the product is separated according to known techniques, for example by solvent evaporation.

To obtain the product of structure (B) with m'>0, one proceeds as in the case m'=0 with the difference that after the $POCl_3$ removal, the reaction adduct is further reacted with variable amounts of di-hydroxy-ended compound. Subsequently hydrolysis is carried out and the above described techniques is performed.

A further object of the present invention is the use of the above described aqueous compositions as additives of the pulp-slurry based on cellulose fibers (wet-end) to obtain oleo-repellent paper.

The following Examples are given for illustrative but not limitative purposes of the invention.

EXAMPLES

Characterization Methods
Aggregate Determination of Component I)

The Dynamic Laser Light Scattering (DLLS) method described in U.S. Pat. No. 6,197,903, which is here enclosed by reference, has been used.

Oleo-Repellence Evaluation

The oleo-repellence evaluation has been carried out by the following tests:

A) Kit Test (KT)

This test follows the TAPPI 557 method referred to 16 solutions having a different concentration of castor oil, toluene and n-heptane. Said solutions discriminate the various oleo-repellent treatment levels and therefore assign the respective KIT test values essentially in function of the surface tension which ranges from 34.5 dine/cm of the solution 1 to 22 dine/cm of the solution 12, to 20.3 dine/cm of the solution 16. The animal or vegetable fats have surface tensions not lower than 24 dine/cm which corresponds to a Kit test value of about 7.

To the paper sized a kit test value is assigned by means of the following procedure: a paper specimen is placed on a clean flat, black-coloured surface and a drop of the solution 1 is let fall thereon from a height of 25 mm. The drop is left in contact with the paper for 15 sec, removing it then by clean blotting paper and the surface under the drop is examined. If said surface does not appear dark (halo) the test is repeated using a solution having a lower surface tension, until the presence of a dark halo is observed.

The kit test value assigned to the paper is that corresponding to the previous solution which gives rise to the dark halo.

B) Ralston Crease Test (RP-2 Test)

The reactants and the instruments necessary for this test are available by Ralston Purina(R) Company. The Ralstone Crease Test allows to evaluate the resistance to the oil penentration in greaseproof papers used in pet-food packaging. The paper specimen to be tested, having 10 cm×10 cm sizes is conditioned for 24 h at 23° C. and 50±2% of relative humidity. Then the specimen is positioned over a glazed paper sheet having the same surface as the specimen, on which a grid of 100 small squares is printed. The whole is placed on a flat, smooth and stiff surface. A metal ring having a diameter of 7.5 cm is put on the paper specimen to be tested. A metal pipe (height=2.5 cm, internal diameter 2.5 cm) is placed in the middle of the specimen, then 5 g of sand (Ottawa sand, 20–30 mesh) are poured into the pipe. The pipe is then removed so as to form a sand cone in the middle of the specimen. Then 1.3 cc of a specific synthetic oil supplied by Ralston Purina which contains 0.1% by weight of a red dye are added to the sand cone by a syringe. Usually for the test at least 4 specimens of the same paper sample are prepared. The specimens with the sand are then positioned in a stove at 60° C. and at 50±2% of relative humidity for 24 hours. This time elapsed the specimens with the sand are removed and the surface of the underlying grid stained by the oil is evaluated. The RP-2 test result is expressed as number of stained small squares, which expresses also the percentage of the small squares, which is the average of the results obtained on at least 4 specimens of the same sample. The sample acceptability threshold limit is 2% of the stained surface.

A similar more severe test consists in using a paper sample previously creased along the two diagonals with a suitable roll, having a weight of 2,040±45 g, diameter of 9.5 cm and width of 4.5 cm, covered by a rubber layer having a thickness of 0.6 cm. The roll speed during the creasing must be of 2–3 cm/sec. Also in this case the same above mentioned acceptability limit is valid.

C) Resistance Test to Oleic Acid

A paper sized specimen having 10 cm×10 cm sizes is put in a stove at 60° C. to condition, then ten drops of oleic acid having the same temperature are let fall from a height of 25 mm. The paper specimen is thus left in the stove for 2 hours at 60° C. The test time elapsed, the paper specimen is taken off from the stove and the oil drops are removed, visually evaluating the paper as in the method A). The test is considered positive if the paper shows no halos either on the side sized or on the opposite side.

D) Resistance Test to Fat Acid Mixtures

Some drops of a mixture of fat acids present in nature, having the following composition by weight: 20% of palmitic acid ($C_{16}$) and 80% of lauric acid ($C_{12}$), are hot deposited (65° C.) on a paper sized specimen having 10×10 cm sizes. The paper is left in a ventilated stove at 65° C. for 5 minutes. This time elapsed, the oil drops are removed and the paper is visually evaluated as for the method A). The test is considered positive if the presence of halos on the paper is not noticed, either on the side sized or even less on the opposite side.

Determination of the Cellulose Refining Degree (Freeness)

The refining degree is determined according to the ATI-CELCA MC 201-76 method which in its turn corresponds to the UNI 7621-76 standard.

Example 1

In a sheetforming machine containing 8 litres of water the following components were introduced: 3 g of cellulose composed of 30% of soft wood and 70% of hard wood having a refining degree of 32° SR, 0.012 g of Nalco™ 7607 (cationic retentive agent) and lastly 0.105 g of an aqueous formulation having pH=9 and an aggregate average size lower than 150 nm, containing 20% by weight of phosphates formed by 85% by moles of a structure B) phosphate wherein m'=0 and by 25% by moles of a structure B) phosphate wherein m'=2, both having $Z=NH_4^+$; L=—$CH_2$—$CH_2(OCH_2CH_2)_n$— with n=2; m=0.5; Y=F; $R_f$ comprising repeating units of type 1) with a'/b'=0.5 and having number average molecular weight of 1,400, the 20% by weight of tetrahydrofuran (THF). The slurry results to contain 0.7% by weight of phosphate I) with respect to the dry cellulose. The obtained sheet was dried at 100° C. for 3 minutes.

The application tests have shown the following oleo-repellent performances:

A) KT=7
B) RP-2=0% (0% even with crease)
C) resistance to the oleic acid=POSITIVE
D) resistance to the mixture of $C_{12}/C_{16}$ fat acids=POSITIVE Example 2

In a sheetforming machine containing 8 litres of water the following components were introduced: 3 g of cellulose consisting of 30% of soft wood and 70% of hard wood having a refining degree of 32° SR, 0.012 g of Nalco™ 7607 and lastly 0.095 g of an aqueous formulation having pH=9 and an aggregate average size lower than 150 nm, containing 22% by weight of the phosphate mixture of Example 1 and 10% by weight of isobutanol. The slurry results to contain 0.7% by weight of phosphate I) with respect to the dry cellulose.

The obtained sheet was dried at 100° C. for 3 minutes.

The application tests have shown the following oleo-repellent performances:

A) KT=7
B) RP-2=0% (0% even with crease)
C) resistance to the oleic acid =POSITIVE
D) resistance to the mixture of $C_{12}/C_{16}$ fat acids=POSITIVE Example 3 (Comparative)

In a sheetforming machine containing 8 litres of water the following components were introduced: 3 g of cellulose consisting of 30% of soft wood and 70% of hard wood having a refining degree of 32° SR, 0.012 g of Nalco™ 7607 and lastly 0.084 g of an aqueous formulation having pH=4 and an aggregate average size higher than 150 nm, containing 20% by weight of the phosphate mixture of Example 1 with the exception that $Z=NCH_{34}^+$, m=1.5. The slurry results to contain 0.7% by weight of phosphate I) with respect to the dry cellulose.

The obtained sheet was dried at 100° C. for 3 minutes.

The application tests have shown the following oleo-repellent performances:

A) KT=5/6
B) RP-2=about 2% (2% even with crease)
C) resistance to the oleic acid=NEGATIVE
D) resistance to the mixture of $C_{12}/C_{16}$ fat acids= NEGATIVE.

Example 4 (Comparative)

In a sheetforming machine containing 8 litres of water the following components were introduced: 3 g of cellulose consisting of 30% of soft wood and 70% of hard wood having a refining degree of 32° SR, 0.012 g of Nalco™ 7607 and 0.021 g of a perfluoroalkyl phosphate Scotchban® FC 807A (3M).

The slurry results to contain 0.7% by weight of the above mentioned phosphate with respect to the dry cellulose.

The obtained sheet was dried at 100° C. for 3 minutes.

The application tests have shown the following oleo-repellent performances:

A) KT=12
B) RP-2=0% (0% even with crease)
C) resistance to the oleic acid =POSITIVE
D) resistance to the mixture of $C_{12}/C_{16}$ fat acids= NEGATIVE.

Example 5 (Comparative)

In a sheetforming machine containing 8 litres of water the following components were introduced: 3 g of cellulose consisting of 30% of soft wood and 70% of hard wood having a refining degree of 32° SR, 0.012 g of Nalco™ 7607 and 0.021 g of a diethanolamine salt of perfluoroalkylethylphosphates AG® 530 N (Asahi Glass). The slurry results to contain 0.7% by weight of the above mentioned phosphate with respect to the dry cellulose.

The obtained sheet was dried at 100° C. for 3 minutes.

The application tests have shown the following oleo-repellent performances:

A) KT=12
B) RP-2=0% (0% even with crease)
C) resistance to the oleic acid=NEGATIVE
D) resistance to the mixture of $C_{12}/C_{16}$ fat acids= NEGATIVE.

Example 6 (Comparative)

In a sheetforming machine containing 8 litres of water the following components were introduced: 3 g of cellulose consisting of 30% of soft wood and 70% of hard wood having a refining degree of 32° SR, 0.012 g of Nalco™ 7607 and lastly 0.105 g of an aqueous formulation containing 20% by weight of a phosphate mixture as in Example 1 but with m=0 in their structure formula, and isopropanol (IPA) in a 1:4 ratio with respect to said mixture. The paper slurry results to contain 0.7% by weight of said phosphate with respect to the dry cellulose.

The obtained sheet was dried at 100° C. for 3 minutes.

The application tests have shown the following oleo-repellent performances:

A) KT=7
B) RP-2=0% (0% even with crease)
C) resistance to the oleic acid=POSITIVE
D) resistance to the mixture of $C_{12}/C_{16}$ fat acids= NEGATIVE.

Example 7 (Comparative)

In a sheetforming machine containing 8 litres of water the following components were introduced: 3 g of cellulose consisting of 30% of soft wood and 70% of hard wood having a refining degree of 32° SR, 0.012 g of Nalco™ 7607 and lastly 0.105 g of the aqueous composition of Example 1 but without the solvent. The slurry results to contain 0.7% by weight of phosphate I) with respect to the dry cellulose.

The obtained sheet was dried at 100° C. for 3 minutes.

The application tests have shown the following oleo-repellent performances:

A) KT=6
B) RP-2=0% (<1% even with crease)
C) resistance to the oleic acid=NEGATIVE (residual halos)
D) resistance to the mixture of $C_{12}/C_{16}$ fat acids= NEGATIVE.

Summarizing Table

| Example | Test A) KT | Test B) RP-2 | Test C) oleic acid | Test D) mix $C_{12}/C_{16}$ acids |
|---|---|---|---|---|
| 1 | 7 | POSITIVE | POSITIVE | POSITIVE |
| 2 | 7 | POSITIVE | POSITIVE | POSITIVE |
| 3 (comp) | 5–6 | about 2% | NEGATIVE | NEGATIVE |
| 4 (comp) | 12 | POSITIVE | POSITIVE | NEGATIVE |
| 5 (comp) | 12 | POSITIVE | NEGATIVE | NEGATIVE |
| 6 (comp) | 7 | POSITIVE | POSITIVE | NEGATIVE |
| 7 (comp) | 6 | POSITIVE | NEGATIVE | NEGATIVE |

What is claimed is:

1. Aqueous compositions comprising the following components:
   I) a phosphate selected from the following:
   (A) T—O—[$R_f$—CFY—L—O]P(O)($O^-Z^+$)(OH)
   (B) (OH)$_m$($O^-Z^+$)$_{2-m}$P(O)[O—L—YFC—O—$R_f$—CFY—L—O—P(O)($O^-Z^+$)]$_{m'}$—[O—L—YFC—O—$R_f$—CFY—L—O]P(O)($O^-Z^+$)$_{2-m}$(OH)$_m$ or mixtures of (A) and (B),
   wherein:
   m' is an integer from 0 to 20
   L is an organic group selected from —CH$_2$—(OCH$_2$CH$_2$)$_n$—, —CO—NR'—(CH$_2$)$_q$—, wherein R'=H or C$_1$ to C$_4$ alkyl;
   n is a number from 0 to 8;
   q is a number from 1 to 8;
   $Z^+$=alkaline metal ion or a NR$_4$ group, wherein R=H, C$_1$ to C$_4$ alkyl, or an aliphatic amine ion;
   Y=F, CF$_3$;
   m is a number between 0 to 1, extremes included;
   $R_f$ is a (per)fluoropolyoxyalkylene chain having a number average molecular weight between 350 and 8,000, formed by repeating units, statistically distributed along the chain, having at least one of the following structures:
   (CFXO), (CF$_2$CF$_2$O), (CF$_2$CF$_2$CF$_2$O), (CF$_2$CF$_2$CF$_2$CF$_2$O), (CR$_4$R$_5$CF$_2$CF$_2$O), (CF(CF$_3$)CF$_2$O), (CF$_2$CF(CF$_3$)O),
   wherein
   X=F, CF$_3$;
   R$_4$ and R$_5$ are equal to or different from each other and are selected from H, Cl, or perfluoroalkyl from 1 to 4 carbon atoms;
   T is a (per)fluoroalkyl group selected from —CF$_3$, —C$_2$F$_5$, —C$_3$F$_7$, —CF$_2$Cl, —C$_2$F$_4$Cl, —C$_3$F$_6$Cl, optionally substituted with one or two H atoms, at the place of F atoms, and
   II) a solvent selected from C$_1$ to C$_5$ aliphatic alcohols, aliphatic and cyclic ethers, aliphatic acetates, and mixtures thereof
   wherein the ratio by weight between components I) and II) is in the range of 1:1 to 1:0.05.

2. The aqueous compositions according to claim 1, wherein a phosphate B) mixture is used formed respectively by a phosphate (B) wherein m' is different from 0, with a phosphate B) wherein m'=0, in a molar ratio in the range of 5:95 to 50:50.

3. The aqueous compositions according to claim 1, wherein $R_f$ is selected from:
   1) —(CF$_2$O)$_{a'}$—$_{(CF2}$CF$_2$O)$_{b'}$—
   wherein a' and b' are integers such that a'/b' is between 0.5 and 2, extremes included;
   2) —(C$_3$F$_6$O)$_r$—(C$_2$F$_4$O)$_b$—(CFXO)$_t$—
   wherein r, b, and t are integers such that r/b is between 0.5 and 2.0 and (r+b)/t is in the range of 10 to 30;
   3) —(C$_3$F$_6$O)$_{r'}$—(CFXO)$_{t'}$—
   wherein r' and t' are integers such that t' can be 0 and when t' is different from 0, r'/t' is between 10 and 30;
   4) —(OCF$_2$CF(CF$_3$))$_z$—OCF$_2$(R'f)$_y$—CF$_2$O—(CF(CF$_3$)CF$_2$O)$_z$—
   wherein y is 0 or 1, R'f is a fluoroalkylene group, and z is an integer;
   5) —(OCF$_2$CF$_2$CR$_4$R$_5$)$_q$—OCF$_2$(R'f)$_y$—CF$_2$O—(CR$_4$R$_5$CF$_2$CF$_2$O)$_s$—
   wherein q and s are integers;
   6) —(C$_3$F$_6$O)$_{r''}$(CFXO)$_{t''}$—OCF$_2$(R'f)$_y$—CF$_2$O(CF(CF$_3$)CF$_2$O)$_{r''}$(CFXO)$_{t''}$—
   wherein r'' and t'' are integers such than r''/t'' is between 10 to 30.

4. The aqueous compositions according to claim 1, wherein the phosphates I) have an average size of the aggregates lower than 150 nm, determined by dynamic laser light scattering (DLLS).

5. The aqueous compositions according to claim 1, containing 20% to 25% by weight of phosphates I), component II) being in the above ratio, the complement to 100% by weight being water.

6. The aqueous compositions according to claim 5, diluted with water up to a concentration of from 0.1% to 5% by weight of phosphate I).

7. A method of producing oleo-repellent paper in wet-end bulk comprising utilizing the aqueous compositions according to claim 1, as additives of the pulp-slurry based on cellulose fibers.

8. The aqueous compositions according to claim 1, wherein m' is an integer from 0 to 4.

9. The aqueous compositions according to claim 1, wherein n is a number from 1 to 3.

10. The aqueous compositions according to claim 1, wherein q is a number from 1 to 3.

11. The aqueous compositions according to claim 1, wherein $R_f$ is a (per)fluoropolyoxyalkylene chain having a number average molecular weight between 500 and 3,000.

12. The aqueous compositions according to claim 1, wherein T is a (per)fluoroalkyl group selected from —CF$_3$, —C$_2$F$_5$, —C$_3$F$_7$, —CF$_2$Cl, —C$_2$F$_4$Cl, —C$_3$F$_6$Cl, optionally substituted with one H atom at the place of an F atom.

13. The aqueous compositions according to claim 1, wherein the solvent is isobutanol.

14. The aqueous compositions according to claim 1, wherein the solvent is tetrahydrofuran.

15. The aqueous compositions according to claim 1, wherein the ratio by weight between components I) and II) is in the range of 1:0.5–1:0.1.

16. The aqueous compositions according to claim 3, wherein R'f is a fluoroalkylene containing 1 to 4 carbon atoms.

* * * * *

UNITED STATES PATENT AND TRADEMARK OFFICE
CERTIFICATE OF CORRECTION

PATENT NO. : 6,790,890 B2 Page 1 of 1
DATED : September 14, 2004
INVENTOR(S) : MacCone et al.

It is certified that error appears in the above-identified patent and that said Letters Patent is hereby corrected as shown below:

Title page,
Item [12], please change the inventor's name to read as follows:
-- Maccone et al. --

Signed and Sealed this

First Day of February, 2005

JON W. DUDAS
*Director of the United States Patent and Trademark Office*